(12) United States Patent
Paul et al.

(10) Patent No.: US 7,559,356 B2
(45) Date of Patent: Jul. 14, 2009

(54) ELECTROKINETIC PUMP DRIVEN HEAT TRANSFER SYSTEM

(75) Inventors: Phillip H. Paul, Livermore, CA (US); Deon S. Anex, Livermore, CA (US); Don W. Arnold, Livermore, CA (US)

(73) Assignee: Eksident Technologies, Inc., Dublin, CA (US)

( * ) Notice: Subject to any disclaimer, the term of this patent is extended or adjusted under 35 U.S.C. 154(b) by 427 days.

(21) Appl. No.: 10/827,799

(22) Filed: Apr. 19, 2004

(65) Prior Publication Data
US 2005/0230080 A1 Oct. 20, 2005

(51) Int. Cl.
*F28D 15/00* (2006.01)

(52) U.S. Cl. ............ 165/267; 165/104.12; 165/104.11; 165/104.25; 165/104.33; 165/80.4; 165/80.5; 417/48; 204/600; 204/601; 204/627

(58) Field of Classification Search ............ 165/104.12, 165/104.11, 104.25, 80.4, 80.5, 267, 104.33; 417/48; 204/600, 601, 627
See application file for complete search history.

(56) References Cited

U.S. PATENT DOCUMENTS

| | | | |
|---|---|---|---|
| 2,615,940 A | 10/1952 | Williams | 171/330 |
| 2,644,900 A | 7/1953 | Hardway, Jr. | 310/2 |
| 2,644,902 A | 7/1953 | Hardway, Jr. | 310/2 |
| 2,661,430 A | 12/1953 | Hardway, Jr. | 310/2 |
| 2,995,714 A | 8/1961 | Hannah | 331/107 |
| 3,143,691 A | 8/1964 | Hurd | 317/231 |
| 3,209,255 A | 9/1965 | Estes et al. | 324/94 |
| 3,298,789 A | 1/1967 | Mast et al. | |
| 3,427,978 A | 2/1969 | Hanneman et al. | 103/1 |
| 3,544,237 A | 12/1970 | Walz | 417/48 |
| 3,630,957 A | 12/1971 | Rey et al. | |
| 3,682,239 A | 8/1972 | Abu-Romia | 165/1 |
| 3,923,426 A * | 12/1975 | Theeuwes | 204/630 |
| 4,383,265 A | 5/1983 | Kohashi | |
| 4,396,925 A | 8/1983 | Kohashi | |
| 4,402,817 A | 9/1983 | Maget | |
| 4,886,514 A * | 12/1989 | Maget | 604/891.1 |
| 4,921,041 A | 5/1990 | Akachi | 165/104.29 |
| 4,999,069 A | 3/1991 | Brackett et al. | |

(Continued)

FOREIGN PATENT DOCUMENTS

CN 2286429 Y 7/1998

(Continued)

OTHER PUBLICATIONS

Adamson A.W. et al., *Physical Chemistry of Surfaces*, pp. 185-187 (Wiley, NY 1997).

(Continued)

*Primary Examiner*—John K Ford
(74) *Attorney, Agent, or Firm*—Marc Karish; Sheldon Mak Rose & Anderson (57) ABSTRACT

A heat transfer system comprising a primary heat exchanger for receiving heat from a heat source; a secondary heat exchanger for exhausting heat to a heat sink; a conduit connecting the primary heat exchanger and the secondary heat exchanger; and an electrokinetic pump for pumping a heat exchange fluid between the primary heat exchanger and the secondary heat exchanger through the conduit.

12 Claims, 9 Drawing Sheets

U.S. PATENT DOCUMENTS

| | | | |
|---|---|---|---|
| 5,037,457 A | 8/1991 | Goldsmith et al. | |
| 5,041,181 A | 8/1991 | Brackett et al. | |
| 5,087,338 A | 2/1992 | Perry et al. | |
| 5,126,022 A | 6/1992 | Soane et al. | |
| 5,219,020 A | 6/1993 | Akachi | 165/104.26 |
| 5,534,328 A | 7/1996 | Ashmead et al. | |
| 5,573,651 A | 11/1996 | Dasgupta et al. | 204/601 |
| 5,581,438 A | 12/1996 | Halliop | |
| 5,683,443 A | 11/1997 | Munshi et al. | |
| 5,858,193 A | 1/1999 | Zanzucchi et al. | 204/601 |
| 5,888,390 A | 3/1999 | Craig | |
| 5,942,093 A | 8/1999 | Rakestraw et al. | 204/450 |
| 5,958,203 A | 9/1999 | Parce et al. | |
| 5,961,800 A | 10/1999 | McBride et al. | 204/450 |
| 5,964,997 A | 10/1999 | McBride | |
| 5,989,402 A | 11/1999 | Chow et al. | |
| 5,997,708 A | 12/1999 | Craig | |
| 6,007,690 A | 12/1999 | Nelson et al. | |
| 6,012,902 A | 1/2000 | Parce | 417/48 |
| 6,013,164 A | 1/2000 | Paul et al. | 204/450 |
| 6,019,882 A | 2/2000 | Paul et al. | 204/450 |
| 6,054,034 A | 4/2000 | Soane et al. | |
| 6,068,243 A | 5/2000 | Hoggan | 256/34 |
| 6,068,767 A | 5/2000 | Garguilo et al. | 210/198.2 |
| 6,074,725 A | 6/2000 | Kennedy | |
| 6,080,295 A | 6/2000 | Parce et al. | |
| 6,086,243 A | 7/2000 | Paul et al. | 366/273 |
| 6,100,107 A | 8/2000 | Lei et al. | |
| 6,106,685 A | 8/2000 | McBride et al. | 204/600 |
| 6,126,723 A | 10/2000 | Drost et al. | |
| 6,129,973 A | 10/2000 | Martin et al. | |
| 6,137,501 A * | 10/2000 | Wen et al. | 346/140.1 |
| 6,156,273 A | 12/2000 | Regnier et al. | |
| 6,171,067 B1 | 1/2001 | Parce | |
| 6,176,962 B1 | 1/2001 | Soane et al. | |
| 6,210,986 B1 | 4/2001 | Arnold et al. | |
| 6,224,728 B1 | 5/2001 | Oborny et al. | 204/450 |
| 6,255,551 B1 | 7/2001 | Shapiro et al. | 588/204 |
| 6,267,858 B1 | 7/2001 | Parce et al. | |
| 6,277,257 B1 | 8/2001 | Paul et al. | 204/450 |
| 6,287,440 B1 | 9/2001 | Arnold et al. | 204/450 |
| 6,290,909 B1 | 9/2001 | Paul et al. | 422/70 |
| 6,320,160 B1 | 11/2001 | Eidsnes et al. | |
| 6,344,145 B1 | 2/2002 | Garguilo et al. | |
| 6,352,577 B1 | 3/2002 | Martin et al. | |
| 6,406,605 B1 | 6/2002 | Moles | 204/601 |
| 6,409,698 B1 * | 6/2002 | Robinson et al. | 604/19 |
| 6,418,968 B1 | 7/2002 | Pezzuto et al. | |
| 6,444,150 B1 | 9/2002 | Arnold | |
| 6,460,420 B1 | 10/2002 | Paul et al. | 73/861.52 |
| 6,472,443 B1 | 10/2002 | Shepodd | |
| 6,477,410 B1 | 11/2002 | Henley et al. | 604/20 |
| 6,495,015 B1 | 12/2002 | Schoeniger et al. | |
| 6,529,377 B1 | 3/2003 | Nelson et al. | |
| 6,689,373 B2 | 2/2004 | Johnson et al. | |
| 6,719,535 B2 | 4/2004 | Rakestraw et al. | 417/50 |
| 6,729,352 B2 | 5/2004 | O'Connor et al. | |
| 6,755,211 B1 | 6/2004 | O'Connor et al. | |
| 6,770,182 B1 | 8/2004 | Griffiths et al. | |
| 6,814,859 B2 | 11/2004 | Koehler et al. | |
| 6,942,018 B2 * | 9/2005 | Goodson et al. | 165/80.4 |
| 6,952,962 B2 * | 10/2005 | Hasselbrink et al. | 73/253 |
| 6,994,151 B2 * | 2/2006 | Zhou et al. | 165/80.4 |
| 7,235,164 B2 * | 6/2007 | Anex et al. | 204/600 |
| 7,267,753 B2 | 9/2007 | Anex et al. | |
| 2001/0008212 A1 | 7/2001 | Shepodd et al. | 204/451 |
| 2002/0048425 A1 | 4/2002 | McBride et al. | |
| 2002/0056639 A1 | 5/2002 | Lackritz et al. | |
| 2002/0059869 A1 | 5/2002 | Martin et al. | |
| 2002/0066639 A1 | 6/2002 | Taylor et al. | |
| 2002/0070116 A1 | 6/2002 | Ohkawa | 204/603 |
| 2002/0089807 A1 | 7/2002 | Bluvstein et al. | |
| 2002/0125134 A1 | 9/2002 | Santiago et al. | 204/450 |
| 2002/0166592 A1 | 11/2002 | Liu et al. | |
| 2002/0185184 A1 | 12/2002 | O'Connor et al. | |
| 2002/0187074 A1 | 12/2002 | O'Connor et al. | |
| 2002/0187557 A1 | 12/2002 | Hobbs et al. | |
| 2002/0189947 A1 | 12/2002 | Paul et al. | |
| 2002/0194909 A1 | 12/2002 | Hasselbrink, Jr. et al. | |
| 2002/0195344 A1 | 12/2002 | Neyer et al. | |
| 2003/0052007 A1 | 3/2003 | Paul et al. | |
| 2003/0061687 A1 | 4/2003 | Hansen et al. | |
| 2003/0062149 A1 * | 4/2003 | Goodson et al. | 165/104.11 |
| 2003/0116738 A1 | 6/2003 | O'Connor et al. | |
| 2003/0143081 A1 | 7/2003 | Rakestraw et al. | |
| 2003/0150792 A1 | 8/2003 | Koehler et al. | |
| 2003/0198130 A1 | 10/2003 | Karp et al. | |
| 2003/0198576 A1 | 10/2003 | Coyne et al. | |
| 2003/0206806 A1 | 11/2003 | Paul et al. | |
| 2003/0226754 A1 | 12/2003 | Le Febre | |
| 2004/0011648 A1 | 1/2004 | Paul et al. | |
| 2004/0074768 A1 | 4/2004 | Anex et al. | |
| 2004/0074784 A1 | 4/2004 | Anex et al. | |
| 2004/0087033 A1 | 5/2004 | Schembri | |
| 2004/0101421 A1 | 5/2004 | Kenny et al. | |
| 2004/0115731 A1 | 6/2004 | Hansen et al. | |
| 2004/0118189 A1 | 6/2004 | Karp et al. | |
| 2004/0129568 A1 | 7/2004 | Seul et al. | |
| 2004/0163957 A1 | 8/2004 | Neyer et al. | |
| 2004/0182709 A1 | 9/2004 | Griffiths et al. | |
| 2004/0238052 A1 | 12/2004 | Karp et al. | |
| 2004/0241004 A1 | 12/2004 | Goodson et al. | |
| 2004/0241006 A1 | 12/2004 | Taboryski et al. | |
| 2004/0247450 A1 | 12/2004 | Kutchinsky et al. | |
| 2005/0247558 A1 | 11/2005 | Anex et al. | |

FOREIGN PATENT DOCUMENTS

| | | |
|---|---|---|
| EP | 0421234 | 4/1991 |
| EP | 1063204 | 12/2000 |
| JP | 3087659 | 4/1991 |
| JP | 07269971 | 10/1995 |
| JP | 07269971 A * | 10/1995 |
| WO | WO 96/39252 | 12/1996 |
| WO | WO 99/16162 | 4/1999 |
| WO | 0004832 | 2/2000 |
| WO | WO 00/04832 | 3/2000 |
| WO | 0055502 | 9/2000 |
| WO | 0079131 | 12/2000 |
| WO | 0125138 | 4/2001 |
| WO | WO 02/068821 | 9/2002 |
| WO | 02086332 | 10/2002 |
| WO | 04027535 | 4/2004 |

OTHER PUBLICATIONS

Ananthakrishnan, V. et al., *A.I. Ch.E. Journal*, 11(6):1063-1072 (Nov. 1965).

Aris, R., *Oxidation of organic sulphides. VI*, Proc. Roy. Soc. (London), 235A:67-77.

Burgreen, D. et al.,*The Journal of Physical Chemistry*, 68(95):1084-1091 (May 1964).

Chatwin, P.C. et al., *J. Fluid Mech.*, 120:347-358 (1982).

Doshi, M.R. et al., *Chemical Engineering Science*, 33:795-804 (1978).

Drott, J. et al., *J. Micromech. Microeng.* 7:14-23 (1997).

Gan, W. et al. *Talanta* 51:667-675 (2000).

Jessensky O. et al., *J. Electrochem, Soc.* 145(11): 3735-3740 (Nov. 1998).

Johnson, D.L. et al.,*Physical Review Letters*, 37(7):3502-3510 (Mar. 1, 1988).

Johnson, D.L. et al., *Physical Review Letter*, 57(20):2564-2567 (Nov. 17, 1986).

Johnson, D.L. et al., *J. Fluid Mech.* 176:379-402 (1987).

Kobatake, Y. et al., *J. Chem. Phys.* 40(8):2212-2218 (Apr. 1964).

Kobatake, Y. et al., *J. Chem. Phys.* 40(8):2219-2222 (Apr. 1964).
Ma, Y. et al., *Microporous and Mesoporous Materials*, 37:243-252(2000).
Morrison, F.A. et al., *J. Chem. Phys.* 43:2111-2115 (1965).
Nakanishi, K. et al., *Journal of Crystalline Solids*, 139:1-13 (1992).
Paul, P.H. et al., *Micro Total Analysis Systems*, pp. 583-590 (2000).
Paul, P.H. et al., *Micro Total Analysis Systems*, pp. 49-52 (1998).
Peters, E C. et al., *Anal. Chem.* 69:3646-3649 (1997).
Philipse, A.P., *Journal of Materials Science Letters*, 8: 1371-1373 (1989).
Rastogi, R.P., *J. Scient. Ind. Res.*, (28):284-292 (Aug. 1969).
Rice, C.L. et al., *J. Phys. Chem.* 69(11):4017-4024 (Nov. 1965).
Rosen, M.J., *Surfactants and Interfacial Phenomena*, Second Ed., John Wiley & Sons, pp. 32-107.
Schmid, G. *J. Membrane Sci.* 150:159-170 (1998).
Schmid, G. et al., *J. Membrane Sci.* 150:197-209 (1998).
Taylor, G., *Prox. Roy. Soc.* (London) 21:186-203.
Weston, A. et al., *HPLC and CE, Principles and Practice*, pp. 82-85, Academic Press.
Wijnhoven, J. et al., *Science*, 281:802-804 (Aug. 7, 1998).
Yzawa, T., *Key Engineering Materials*, 115: 125-146 (1996).
Notification of Transmittal and International Search Report and Written Opinion for PCT/US05/12757, dated Apr. 9, 2007, 5 pages.
Notification of Transmittal and International Preliminary Report on Patentability and Written Opinion for PCT/US05/12757/, dated Apr. 24, 2007, 5 pages.
Becker, et al., "Polymer Microfabrication Methods for Microfluidic Analytical Applications," Electrophoresis, 2000, vol. 21, pp. 12-26.
Belfer, et al., "Surface Modification of Commercial Polyamide Reverse Osmosis Membranes," J. Membrane Sci., 1988, vol. 139, pp. 175-181.
Conway, B.E., "Electrochemical Capacitors Their Nature, Function, and Applications," Electrochemistry Encyclopedia, 2003. Available at http://electrochem.cwru.edu/ed/encycl/art-c03-elchem-cap.htm, accessed May 16, 2006, 14 pages.
Conway, B.E., "Electrochemical Supercapacitors Scientific Fundamentals and Technological Applications," Kluwer Academic/Plenum Publishers, 1999, pp. 12-13, 104-105. 192-195.
Gongora-Rubio, et al., "The Utilization of Low Temperature Co-Fired Ceramics (LTCC-ML) Technology for Meso-Scale EMS, a Simple Thermistor Based Flow Sensor," Sensors and Actuators, 1999, vol. 73, No. 3, pp. 215-221.
Haisma, J., "Direct Bonding in Patent Literature," Philips J. Res., 1995, vol. 49, pp. 165-170.
Jimbo, et al., "Surface Characterization of Polyacrylonitrile Membranes: Graft-Polymerized with Ionic Monomers as Revealed by Zeta Potential Measurements," Macromolecules, 1998, vol. 31, pp. 1277-1284.

Klein, E., "Affinity Membranes: a 10 Year Review," J. Membrane Sci., 2000, vol. 179, pp. 1-27.
Martin, et al., "Laminated Plastic Microfluidic Components for Biological and Chemical Systems," J. Vac. Sci. Technol., 1999, vol. 17, pp. 2264-2269.
Mroz, et al., "Disposable Reference Electrode," Analyst, 1998, vol. 123, pp. 1373-1376.
Roberts, et al., "UV Laser Machined Polymer Substrates for the Development of Microdiagnostic Systems," Anal. Chem., 1997, vol. 69, pp. 2035-3042.
Stokes, V.K., "Joining Methods for Plastics and Plastic Composites: An Overview," Poly. Eng. And Sci., 1989, vol. 29, pp. 1310-1324.
Takata, et al., "Modification of transport properties of ion exchange membranes XIV. Effect of molecular weight of polyethyleneimine bonded to the surface of cation exchange membrane by acid-amide bonding on electrochemical properties of the membranes," J. Membrance Sci., 2000, vol. 179, pp. 101-107.
Vinson, J.R., "Adhesive Bonding for Polymer Composites," Polymer Eng. And Science, 1989, vol. 29, pp. 1325-1331.
Watson, et al., "Recent Developments in Hot Plate Welding of Thermoplastics," Poly. Eng. And Sci., 1989, vol. 29, pp. 1382-1386.
Baquiran, et al, "Lippincott's Cancer Chemotherapy Handbook," Second Edition, Lippincot, Philadelphia, 2001.
Chu, et al., "Physicians Cancer Chemotherapy Drug Manual," Jones and Barlett Publisher, Massachusetts, 2002.
Churchill, et al., "Complex Variables and Applications," McGraw-Hill, Inc. New York, 1990.
Gennaro, A.R., "Remington: The Science and Practice of Pharmacy," 20th Edition, Lippincott, Williams & Wilkins, Philadelphia, 2000.
Gleither, H. et al., "Nanocrystalline Materials: A Way To Solids With tunable Electronic Structures And Properties?, " Acta mater, (2001), vol. 49, pp. 737-745.
Goodman and Gilman's "The Pharmacological Basis of Therapeutics," 10th Edition, McGraw Hill Medical Publishing Division, 2001.
Gritsch et al., "Impendance Spectorscopy of Porin and Gramicidin Pores Reconstituted into Supported Lipid Bilayers on Indium-Tin-Oxide Electrodes," Langmuir, (1998), vol. 14, pp. 3118-3125.
Jackson J.D., "Classical Electrodynamics," 2nd Edition, John Wiley & Sons, Inc., New York, 1962.
Kotz et al., "Principles and applications of electrochemical capacitors," Electrochimica Acta., (2000), vol. 45, pp. 2483-2498.
Skeel, R., "Handbook of Cancer Chemotherapy," 6th Edition, Lippincott Williams & Wilkins, 2003.
Uhlig, E.L.P. et al., "The electro-osmotic actuation of implantable insulin micropumps," Journal of Biomedical Materials Research, (1983), vol. 17, pp. 931-943.

* cited by examiner

ELECTROKINETIC PUMP DRIVEN HEAT TRANSFER SYSTEM

CROSS REFERENCE TO RELATED APPLICATIONS

This application is related to International application No. PCT/US03/32895 filed on Oct. 17, 2003, which is a continuation-in-part of U.S. patent application Ser. No. 10/322,083, filed Dec. 17, 2002 and issued on Sep. 11, 2007 as U.S. Pat. No. 7,267,753, which is a continuation-in-part of U.S. patent application Ser. No. 10/273,723, filed Oct. 18, 2002 and issued on Jun. 26, 2007 as U.S. Pat. No. 7,235,164. The entire disclosure of each of these applications is hereby incorporated herein for all purposes.

BACKGROUND

The present invention relates to heat transfer systems, and more particularly to a system for heat transfer employing an electrokinetic pump.

Heat reduction systems typically remove heat from a source at an elevated temperature such as, for example, a computer processor, and exhaust the heat from the source to a heat sink having a lower temperature, such as ambient air temperature. By this heat transfer process, the source of heat is maintained at a finite temperature above the sink temperature. Modern electronic systems typically contact a finned heat sink to the source of heat and flow air across the heat sink to remove excess heat. Faster processors and more high power electronics in today's computer cases generate more heat and raise the air temperature within the computer case substantially higher than ambient air temperature. This makes the sink temperature (i.e., the air within the case) higher and thus raises the operating temperature of the components within the case.

The quest for more compact electronics such as very slim laptop computers, leaves little room within the case through which air can flow, thereby making it difficult to achieve the air flow rates needed to adequately cool the components. There is therefore a need for improved methods of cooling electronic systems and other components. Preferably, improvements will not rely on air moving through the electronics enclosure, but rather will remove heat from a source and transfer it to a case-mounted external exchanger, such as a fin, where the heat can be exchanged with lower temperature ambient air.

It is known to use heat pipes to assist in heat exchange. Typically a heat pipe is a sealed conduit partially filled with liquid that has a wicking structure along the inside walls. One end of the heat pipe is heated and the other end cooled. Liquid evaporates from the heated end, and the resulting vapor flows down the core of the heat pipe to be condensed at the cooled end. Liquid is resupplied to the heated end by wicking along the conduit walls. While heat pipes are attractive, because they are fully sealed and have no mechanical moving parts, they have limitations such as limited heat flux capacity, sensitivity to orientation and the need for a rigid conduit. Additionally, the wick structure can be expensive and hard to manufacture reliably.

A known alternative to the heat pipe is a capillary-pumped-loop, also called the pulsating-heat-pipe or "PHP." This alternative is described in U.S. Pat. Nos. 4,921,041 and 5,219,020. The pulsating heat pipes are used in a fashion similar to a conventional heat pipe. The pulsating heat pipe is a conduit that is sealed and is partially filled with liquid. The pulsating heat pipe is different than a conventional heat pipe in that the pulsating heat pipe does not employ an internal wicking structure. The liquid within the conduit is naturally distributed as liquid-vapor slugs. In application, a portion, or portions, of the pulsating heat pipe is heated and another portion, or portions, of the pulsating heat pipe are cooled. The production of vapor at the heated portions raises the pressure locally and this causes motion of the liquid slugs along the conduit. This motion serves to move the liquid from heated to cooled terminals of the device. However, as with heat pipes, there are limitations with maximum heat flux, a strong sensitivity to orientation, and a strong sensitivity to the amount of liquid inside of the conduit.

Additionally, it is known to use flowing liquid cooling loops. However, a flowing liquid system requires a mechanical pump that adds size, weight, annoying noise and vibration and that can be prone to premature failure and/or leakage. Thus, there remains a need for an improved cooling system that can transfer heat from a heat source to an external heat exchanger.

SUMMARY

Accordingly, the present invention is directed to a heat transfer system having a primary heat exchanger for receiving heat from a heat source; a secondary heat exchanger for exhausting heat to a heat sink; a conduit connecting the primary heat exchanger and the secondary heat exchanger; and an electrokinetic pump for pumping a heat exchange fluid between the primary heat exchanger and the secondary heat exchanger through the conduit. The present invention can further include a heat exchange fluid in the heat exchangers and the conduit.

A controller can be coupled to the electrokinetic pump. The controller can operate the electrokinetic pump in a cyclic mode. In an additional embodiment of the present invention, the heat transfer system has a plurality of secondary heat exchangers. In yet another embodiment of the present invention, the heat transfer system has a plurality of primary heat exchangers and a plurality of secondary heat exchangers. The plurality of primary heat exchangers and the plurality of secondary heat exchangers can be connected in series along a single flow path and operated thermally in parallel. The plurality of primary heat exchangers and the plurality of secondary heat exchangers can be connected in parallel along two or more flow paths.

The heat transfer fluid can function as an acceptable electrolyte for the electrokinetic pump. Alternatively, the heat exchange fluid is isolated from the electrolyte used in the electrokinetic pump by a flexible member. Optionally, the heat transfer fluid is water. The heat transfer system can utilize a single-phase heat exchange fluid or a multiphase heat exchange fluid.

The present invention is also directed to a method of removing heat using the heat exchange system described herein. In the method of removing heat, a primary heat exchanger is placed in thermal communication with a heat source. A secondary heat exchanger is placed in thermal communication with a heat sink. A pump is operated to move a heat exchange fluid in the primary heat exchanger through a conduit to the secondary heat exchanger and to move the heat exchange fluid in the secondary heat exchanger through the conduit to the primary heat exchanger. The pump can be operated to move the heat exchange fluid unidirectionally. Alternatively, the pump can be operated in a cyclic mode.

THE DRAWINGS

A better understanding of the present invention will be had with reference to the accompanying drawings in which.

DESCRIPTION

As used herein, the term "primary heat exchanger" refers to a heat exchanger in thermal communication with a heat source. As used herein, the term "secondary heat exchanger" refers to a heat exchanger in thermal communication with a heat sink. As used herein, the term "coupled" means operatively connected to and does not require "coupled" objects to be in direct physical contact with each other.

Figure 1:
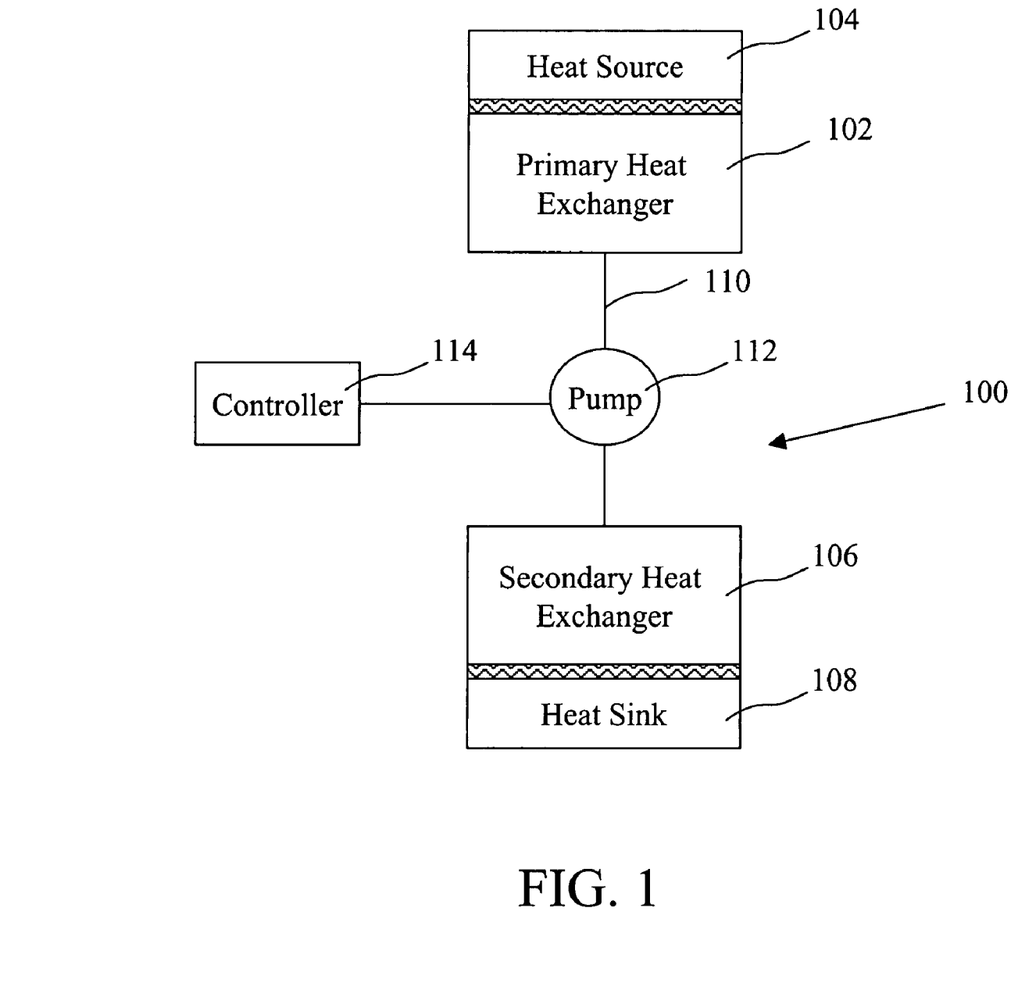
FIG. 1 is a schematic diagram of a heat transfer system according to a first embodiment of the present invention employing a single primary heat exchanger and a single secondary heat exchanger.

The present invention, according to a first embodiment, is directed to a heat transfer system 100. As shown in FIG. 1, the heat transfer system 100 has a primary heat exchanger 102 in thermal communication with a heat source 104 and a secondary heat exchanger 106 in thermal communication with a heat sink 108. A conduit 110 couples the primary heat exchanger 102 to the secondary heat exchanger 106. A heat exchange fluid is pumped through the conduit 110 by an electrokinetic pump 112 coupled to a controller 114. While there are many possible heat exchange fluids, the preferable fluid is water, from the standpoint of heat transfer properties, and also from the standpoint of avoiding noxious liquids in the case of leakage and for final disposal of the system.

Figure 2:
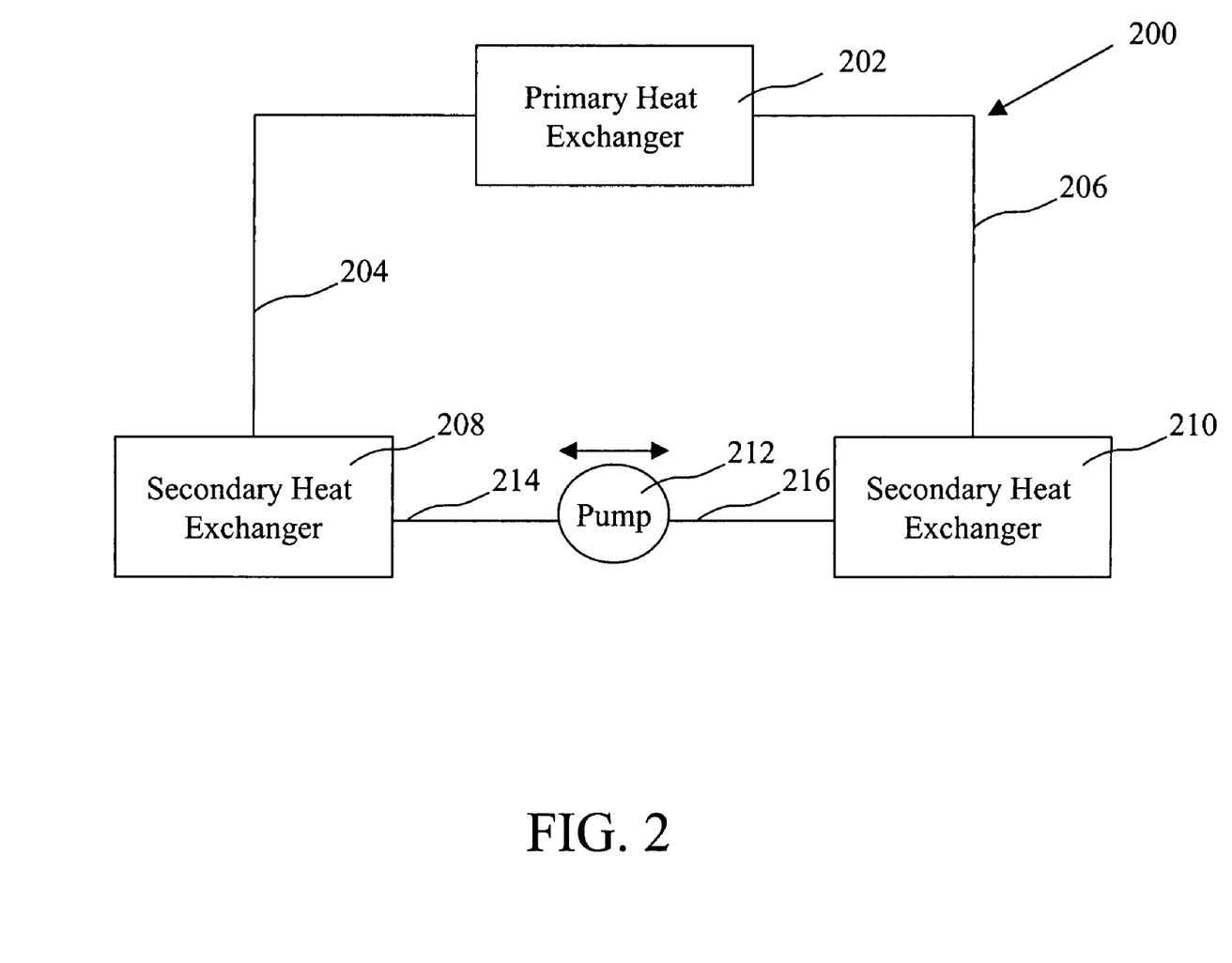
FIG. 2 is a schematic diagram of a heat transfer system according to a second embodiment of the present invention employing two secondary heat exchangers.

FIG. 2 is a schematic diagram of a heat transfer system 200 according to a second embodiment of the present invention. As shown in FIG. 2, heat is received at a primary exchanger 202. The heat received by the primary exchanger 202 is carried by liquid motion of a heat exchange fluid through two conduits 204, 206 from the primary heat exchanger 202 to secondary heat exchangers 208, 210 where the heat is exhausted. The motion of the liquid is produced by an electrokinetic pump 212 coupled to the secondary heat exchangers 208, 210 by two pump conduits 214, 216.

The pump 212 can pump the fluid uni-directionally. Alternatively, the pump can operate in a cyclic mode, where in one half of the cycle the heat exchange fluid is directed towards one secondary exchanger, and where in the other half of the cycle the heat exchange fluid is directed toward the other secondary exchanger. The system 200 can operate in a single-phase mode where all of the heat exchange fluid remains a liquid. Alternatively, the system 200 can operate in a multiphase mode where some portion of the heat exchange fluid flowing through the primary exchanger as a liquid is evaporated into a gas and where some of a gas flowing into the secondary exchanger is condensed into a liquid.

For single-phase operation using water as the heat exchange fluid to carry away 200 watts of heat with a 20° C. rise in liquid temperature above the heat sink temperature requires a flow rate of about 143 mL/min, thereby requiring a substantial size pump. Alternatively, if some of the water is allowed to boil, then the system takes advantage of the large heat of vaporization of water. In this case, the heat transfer loop is evacuated and partially filled with water (i.e., portions of the system contain water and the other portions contain water vapor). With a 50% vaporization in the primary exchanger, to carry away 200 W of heat with a 20° C. rise in liquid temperature above the heat sink temperature requires a flow rate of about 9.4 mL/min. A higher degree of vaporization requires even less flow rate, for example a 75% vaporization requires a flow rate of about 6.4 mL/min to carry away 200 W of heat with a 20° C. rise in liquid temperature above the heat sink temperature. However, it is desirable for some liquid to always remain in the heat-receiving primary exchanger.

Figure 3:
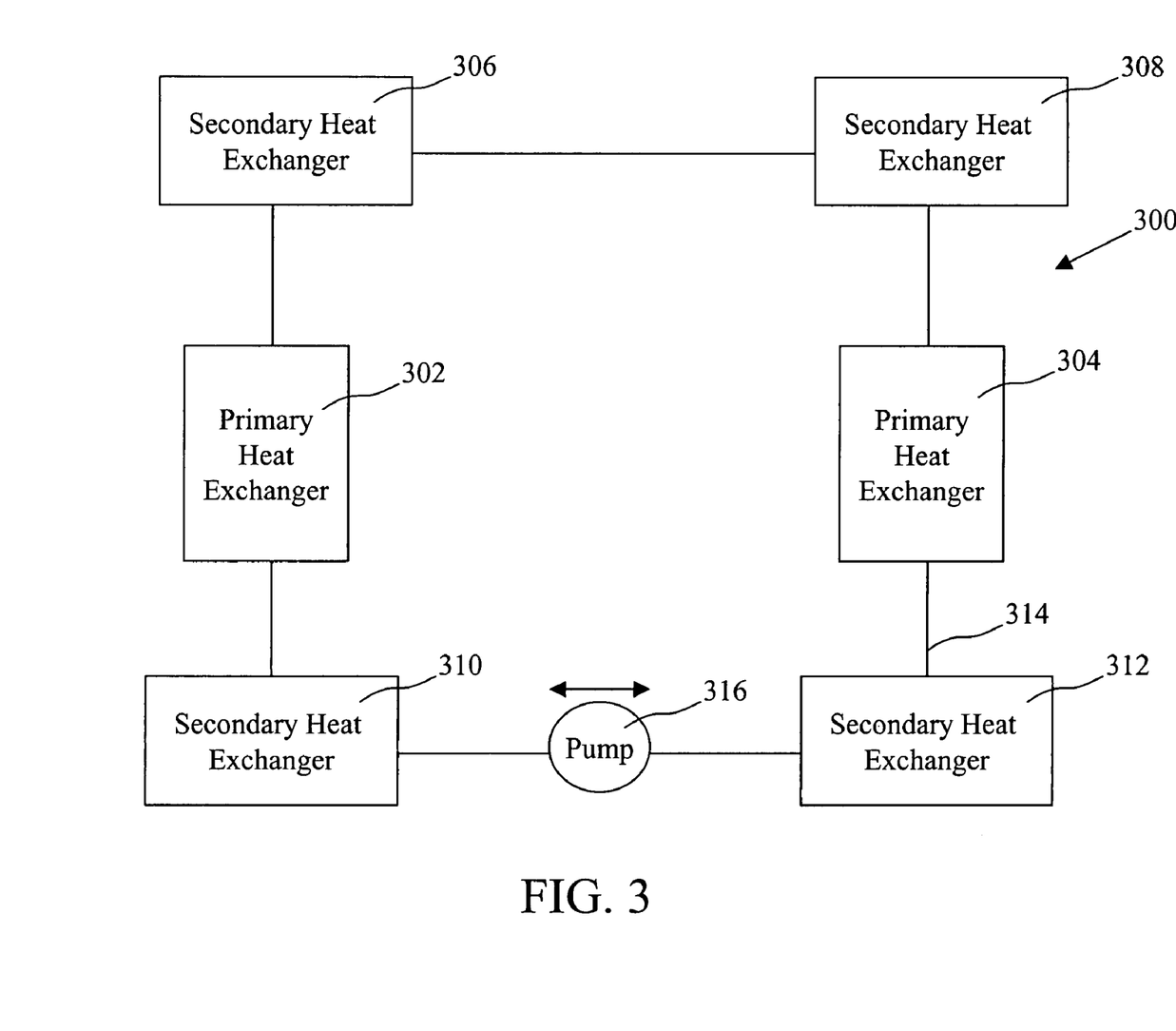
FIG. 3 is a schematic diagram of a heat transfer system according to a third embodiment of the present invention employing two primary heat exchangers and four secondary heat exchangers.

FIG. 3 is a schematic diagram of a heat transfer system 300 according to a third embodiment of the present invention. As shown in FIG. 3, two primary exchangers 302 and 304, receive heat from a heat source. The heat received is exhausted through four secondary exchangers 306, 308, 310, 312. Two of the secondary heat exchangers are coupled in series to each primary heat exchanger along a conduit 314. Two of the secondary heat exchangers are coupled in series. A single electrokinetic pump 316 is coupled to the conduit 314 between the other two secondary heat exchangers. The electrokinetic pump 316 provides fluid flow to a heat exchange fluid in the conduit 314.

As seen in FIG. 3, all of the heat exchangers are connected in series along a single flow path and operated thermally in parallel. As used herein, the term "operated thermally in parallel" means that more than one portion of the heat exchange fluid is being acted upon at the same time for a given thermal effect. For example, as heat exchange fluid is moved counterclockwise from the primary heat exchanger 302 to the secondary heat exchanger 310, heat exchange fluid is also moved from primary heat exchanger 304 to secondary heat exchanger 308. Therefore, the system according to a second embodiment requires about one-half the flow rate of that required by the system according to the second embodiment, to remove a given amount of heat, at the cost of requiring more pump pressure. The concept of FIG. 3 is extendable to running an additional number of primary and secondary exchangers in series and by this methodology reducing the required flow rate. Essentially N primary and N+1 secondary exchangers in series gives an N-times reduction in the required flow rate needed to transfer a given amount of heat.

Figure 4:
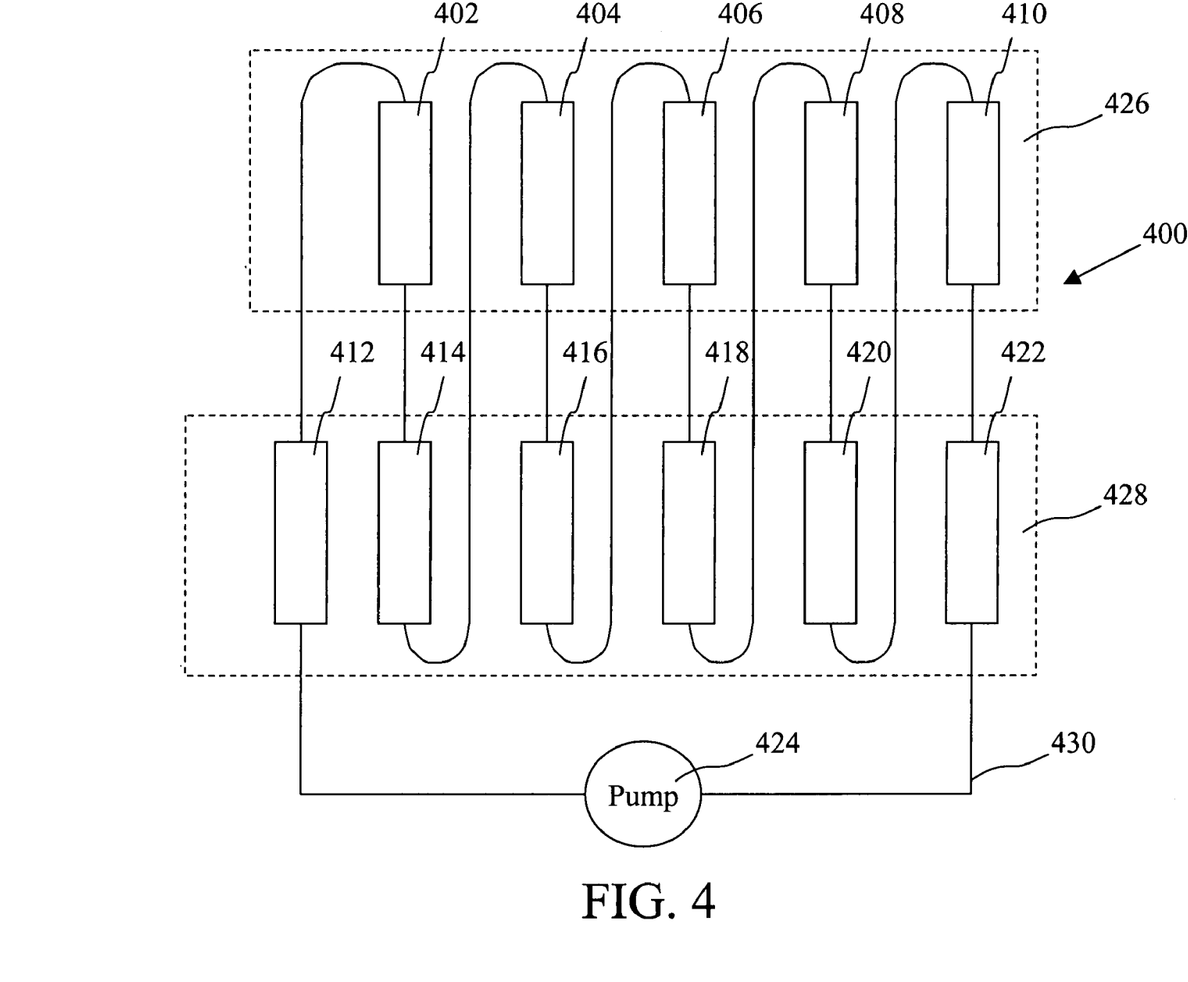
FIG. 4 is a schematic diagram of a heat transfer system according to a fourth embodiment of the present invention.

FIG. 4 is a heat transfer system 400 according to a fourth embodiment of the present invention. The system employs five primary heat exchangers 402, 404, 406, 408, 410 and six secondary exchangers 412, 414, 416, 418, 420, 422 coupled in series along a single flow path, operated thermally in parallel, and driven by a single electrokinetic pump 424. As shown in FIG. 4, the primary heat exchangers are in thermal contact with a heat source 426 and the secondary heat exchangers are in thermal contact with a heat sink 428. The pump 424 supplies a heat exchange fluid that flows through a conduit 430 in fluid communication with all of the primary heat exchangers and all of the secondary heat exchangers.

From the outlet of the pump 424, the heat exchange fluid is carried through the first secondary exchanger 412 which is in thermal contact with the heat sink 428, then to primary heat exchanger 402 which is in thermal contact with the heat source 426. The heat exchange fluid is then carried to the second secondary exchanger 414, followed by the second primary exchanger 404, the third secondary exchanger 416, the third primary exchanger 406, the fourth secondary exchanger 418, the fourth primary exchanger 408, the fifth secondary exchanger 420, the fifth primary exchanger 410, and finally to the sixth secondary exchanger 422. The heat exchange fluid is pumped from the sixth secondary exchanger 422 back to the pump 424. On an alternative cycle of the pump, the flow direction is reversed.

In a multiphase operation, the secondary heat exchangers are filled with liquid, and the primary exchangers are filled with some combination of liquid and vapor. Upon a pump stroke, liquid from the secondary exchangers is pushed into the primary exchangers where a part of the liquid vaporizes. Simultaneously vapor from the primary exchangers is drawn into the secondary exchangers where the vapor condenses. When the pump stroke direction is reversed, liquid from the secondary exchangers is driven into the primary exchangers and vapor from the primary exchangers is then drawn into the secondary exchangers.

Preferably, the internal volume of the secondary exchangers immediately connected to the pump is greater than the amount of liquid displaced by the pump per stroke. This avoids drawing vapor into the pump. Additionally, it is preferable that the amount of liquid dispensed per pump stroke is sufficient to fill the primary exchangers. Therefore, it is preferable that the volume per stroke is about equal to the sum of the volume of the primary exchanger and the volume of the interconnecting conduit between the primary exchanger and the next upstream secondary exchanger.

In FIG. 4, the secondary exchangers 412, 422 closest to the pump 424, can be the same as the other secondary exchangers. Alternatively, the secondary heat exchangers 412, 422 closest to the pump have a sufficiently large internal volume to avoid drawing vapor into the pump. Optionally, the internal volume of the secondary heat exchangers 412, 422 closest to the pump is at least twice the volume delivered per pump stroke. The heat exchangers can be of any type known in the art. Additionally, the primary heat exchangers need not be of the same type as the secondary heat exchangers.

Figure 5:
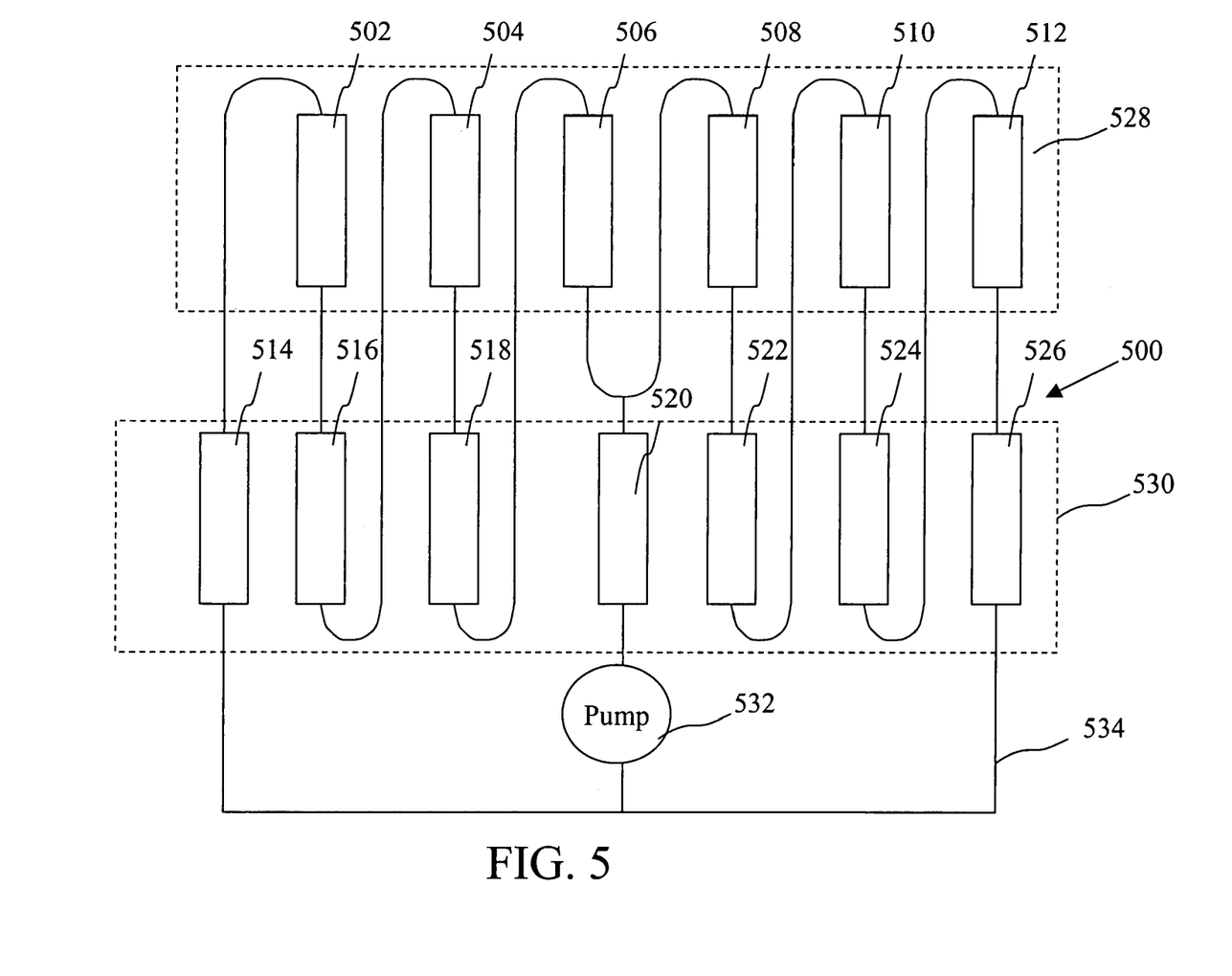
FIG. 5 is a schematic diagram of a heat transfer system according to a fifth embodiment of the present invention.

FIG. 5 is a schematic diagram of a heat transfer system 500 according to a fifth embodiment of the present invention where the heat exchangers are coupled in parallel along two flow paths and operated thermally in parallel. As shown in FIG. 5, the system has six primary exchangers 502, 504, 506, 508, 510, 512 and seven secondary heat exchangers 514, 516, 518, 520, 522, 524, 526. The primary heat exchangers are in thermal contact with a heat source 528 and the secondary heat exchangers are in thermal contact with a heat sink 530. All of the heat exchangers are coupled together and to an electrokinetic pump 532 via a conduit 534. The pump 532 has two ports for input and output. A first port of the pump 532 is coupled to both the first secondary heat exchanger 514 and the seventh secondary heat exchanger 526. The first secondary heat exchanger is coupled to the first primary heat exchanger 502, the flow path then extending through the second secondary heat exchanger 516, the second primary heat exchanger 504, the third secondary heat exchanger 518, and to the third primary heat exchanger 506. The seventh secondary heat exchanger 526 is coupled to the sixth primary heat exchanger 512, the flow path then extending through the sixth secondary heat exchanger 524, the fifth primary heat exchanger 510, the fifth secondary heat exchanger 522, and to the fourth primary heat exchanger 508.

Both the third primary heat exchanger 506 and the fourth primary heat exchanger 508 are coupled via a common conduit to the fourth secondary heat exchanger 520. The fourth secondary heat exchanger 520 is coupled to a second port of the pump 532. Thus, the pump can be connected to one or more exchangers in parallel along two or more flow paths as shown in FIG. 5 where two such series are connected in parallel along two flow paths. The use of N primary exchangers arranged in series requires the pump flow rate to meet the heat load demand where the pump operates into a pressure drop imposed by the series of exchangers. The same number of exchangers can be arranged in parallel along two or more flow paths resulting in a decrease in the back pressure imposed on the pump. Alternatively, the same number of exchangers can be arranged in parallel along two or more flow paths, and the available pump pressure can be employed to use a larger pressure drop per exchanger, thereby providing a more efficient and compact exchanger. Optionally, a plurality of electrokinetic pumps can be used to pump the heat exchange fluid.

Heat Exchangers Suitable for Use in the Present Invention

The design of several different types of heat exchangers is known. Heat exchangers usable with the present invention can be micro-channel heat exchangers or any other form of heat exchanger known in the art. Heat exchangers known in the art, and those detailed below can be utilized in the present invention as a means for receiving heat and as a means for exhausting heat.

Figure 6:
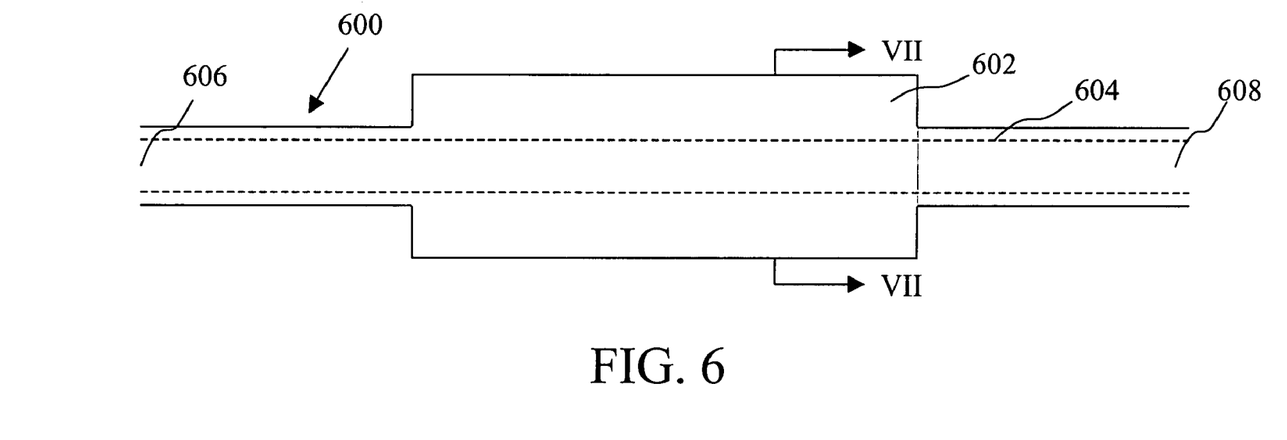
FIG. 6 is a side view of a first heat exchanger usable with the present invention.
Figure 7:
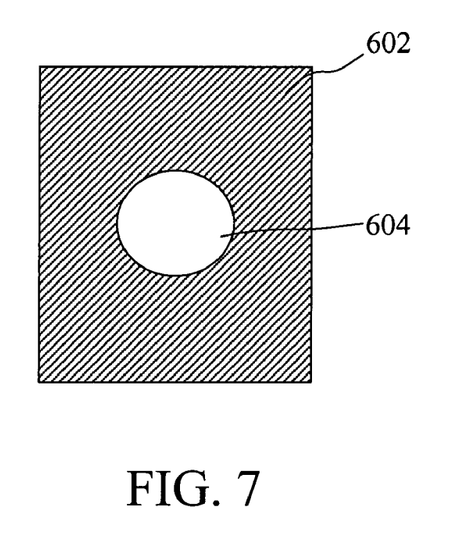
FIG. 7 is a cross-sectional view of the heat exchanger of FIG. 6 taken along line VII-VII.

FIGS. 6 and 7 show a first possible type of heat exchanger 600 usable with the present invention. As shown in FIGS. 6 and 7, heat is transferred by contact to a body 602 that contains a conduit 604. The conduit 604 has a first port 606 and a second port 608. The conduit 604 carries a heat exchange fluid. Optionally, the conduit 604 takes a serpentine path through the body 602 to decrease the heat transfer resistance of the heat exchanger.

Figure 8:
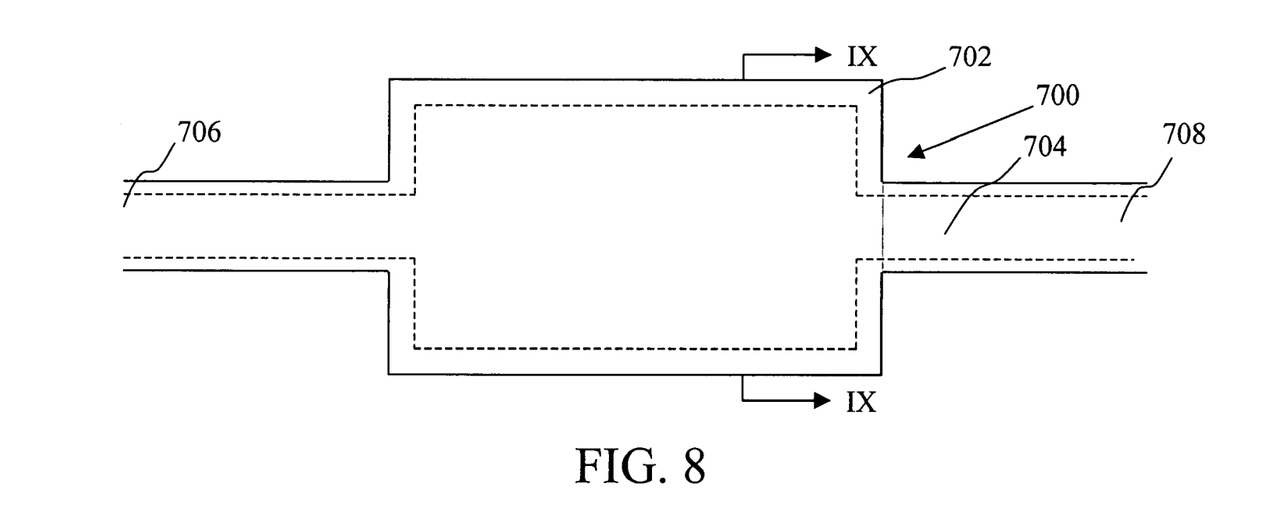
FIG. 8 is a side view of a second heat exchanger usable in the present invention.
Figure 9:
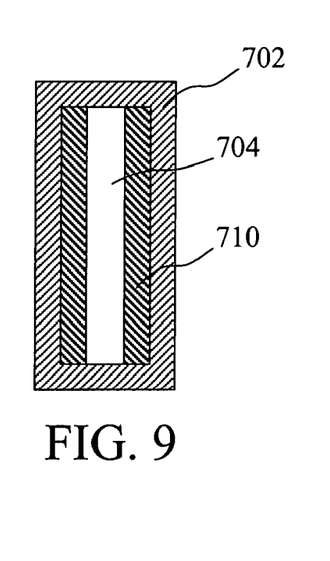
FIG. 9 is a cross-sectional view of the heat exchanger of FIG. 8 taken along line IX-IX.

FIGS. 8 and 9 show a second type of heat exchanger 700 usable with the present invention. As shown in FIGS. 8 and 9, heat is transferred by contact to a body 702 that contains a conduit 704. The conduit 704 has a first port 706 and a second port 708. The conduit 704 carries a heat exchange fluid. Portions of the internal walls of the body 702 are fitted with a wick structure 710 that wicks liquid along the internal walls of the body. The wick structure 710 can be a porous metal, screen, groove or any other wick structure as known in the art. Liquid naturally fills the wick structures leaving the conduit 704 free to carry off any vapor produced.

Figure 10:
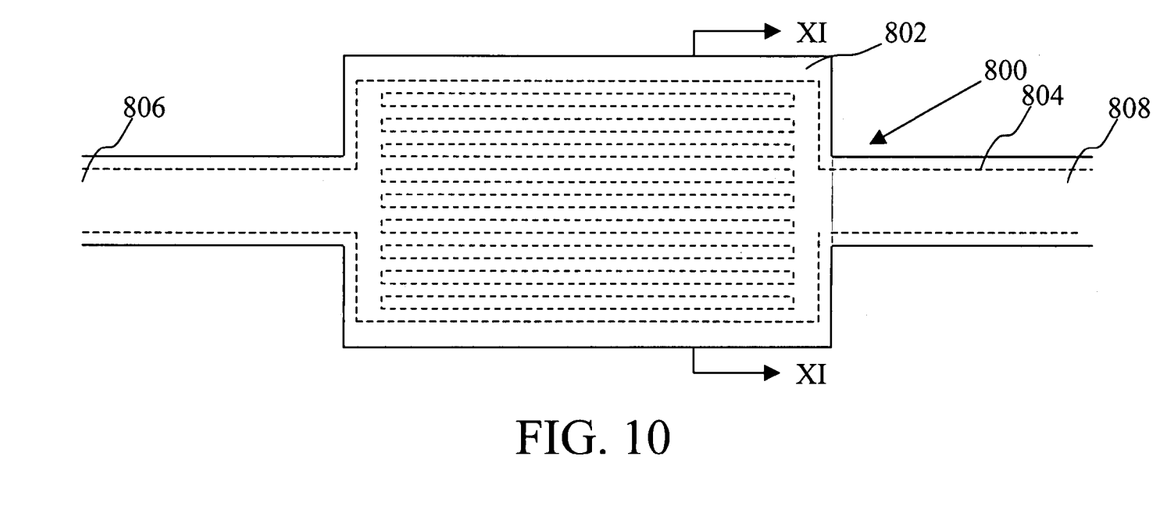
FIG. 10 is a side view of a third heat exchanger usable with the present invention.
Figure 11:
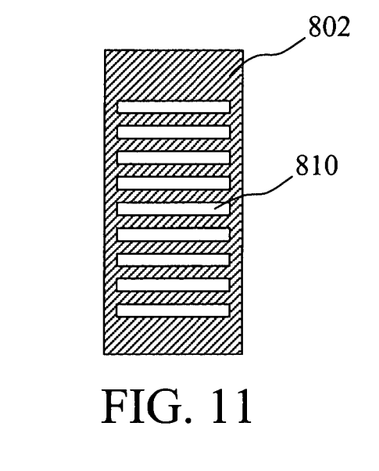
FIG. 11 is a cross-sectional view of the heat exchanger of FIG. 10 taken along line XI-XI.

FIGS. 10 and 11 show a third type of heat exchanger 800 usable with the present invention. As shown in FIGS. 10 and 11, heat is transferred to the body 802. The body contains a conduit 804. The conduit 804 has a first port 806 and a second port 808. The conduit 804 carries the heat exchange fluid. Within the body 802, the conduit 804 is subdivided into a number of parallel passageways 810. One form of this style of heat exchanger is a microchannel heat exchanger. Such a heat exchanger is discussed in "High performance heat sinking for VLSI," by D. B. Tuckerman and R. F. W. Pease, IEEE Electron Dev. Letts., vol. EDL-2, pp. 126-129 (1981), the entire contents of which are hereby incorporated herein by reference in their entirety.

Electrokinetic Pumps Suitable for Use in the Present Invention

Figure 12:
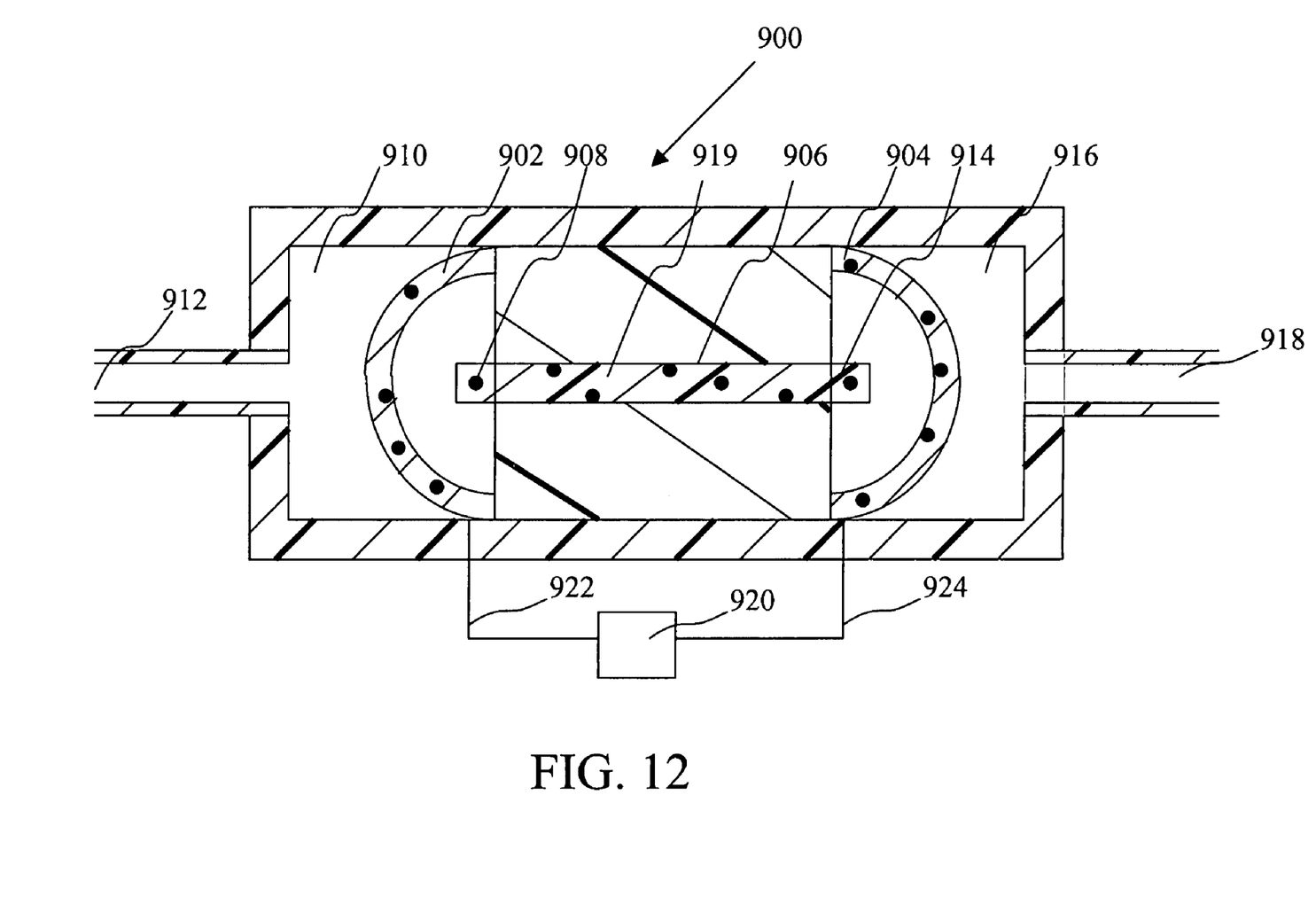
FIG. 12 is schematic diagram of an electrokinetic pump usable with the present invention.

An exemplary electrokinetic pump 900 is shown in FIG. 12. An electrokinetic pump 900 comprises a first electrode 902, a second electrode 904, and a conduit 906. The conduit 906 has a first end 908 which is adjacent to (i.e., is in contact with or separated from) the first electrode 902 and in communication with a first reservoir 910. The first reservoir 910 is in communication with a first port 912 of the electrokinetic pump. A second end 914 of the conduit 906 is adjacent to (i.e., is in contact with or separated from) the second electrode 904 and in fluid communication with a second reservoir 916. The second reservoir 916 is in fluid communication with a second port 918 of the electrokinetic pump. In a conventional electrokinetic pump, the conduit 906 is filled with a porous dielectric medium 919. A power source 920 is connected across the two electrodes 902, 904 by leads 922, 924.

When the conduit is filled with a suitable electrolyte solution, the application of a suitable electrical potential to the electrodes causes electroosmotic flow of the electrolyte solution through the conduit. The net flow rate of the electrolyte solution is the electroosmotic flow modified by any other factors, e.g., hydrostatic pressure, affecting the flow rate.

The term "electrolyte" is used to denote the electrolyte itself (for example, the compound such as an ionic salt) and the solvent in which the compound is dissolved; and the term "chemical change" is used to denote any chemical reaction involving the compound or the solvent or both. The reaction products produced by the chemical change of the electrolyte are undesirable because they can be gasses which must be vented and/or electrochemical products which dissolve in the electrolyte and change its composition, for example change its pH.

Number of Electrodes

Electrokinetic pumps usable with the present invention often contain only two electrodes. However, the electrokinetic pump can contain three or more electrodes, for example three electrodes, one pair of which are active in one period of operation and another pair of which are active in another period of operation. For example, the electrokinetic pump can contain three or more electrodes with porous dielectric mediums having zeta potentials of opposite signs alternating between the electrodes. The electrodes in a device can be the same or different. When one of the electrodes in a capacitive electrode pair is composed of non-capacitive material, there is chemical change of the electrolyte at the non-capacitive electrode but not at the capacitive electrode.

Materials for Capacitive Electrodes

It is desirable that the electrodes supply the current required, even for high flow rates, e.g., greater than 1 mL/min, without significant electrolysis of the pump fluid or significant evolution of the pH of the pump fluid. Avoidance of significant pH evolution of the pump fluid can be accomplished by not allowing the voltage drop between the electrodes and the liquid to exceed the threshold for Faradaic electrochemical reactions, which start at approximately 1.2V for water.

The double-layer capacitance or the pseudocapacitance of the electrodes preferably is charged prior to the beginning of bulk Faradaic processes. Typical values of double layer capacaitance of a plane metal surface (e.g. a drawn metal wire) are 20 to 30 micro Farads/cm$^2$. This value can be substantially increased using methods well-known in the electrochemical arts (e.g. surface roughening, surface etching, platinization of platinum). The double-layer capacitance of the electrodes is preferably at least $10^{-4}$ farads/cm$^2$ and more preferably at least $10^{-2}$ farads/cm$^2$.

The desired strategy is to apply a current to the electrodes to produce a desired flow rate while charging the double-layer capacitance of the electrodes during the first half of the pump cycle. The polarity of the applied field is then changed before Faradaic processes begin, thereby discharging the double-layer capacitance of the electrodes and then recharging the electrodes with the opposite polarity causing the pump fluid to flow in the opposite direction during the second half of the pump cycle.

At least one of the electrodes in a capacitive electrode pair is composed of a capacitive material, i.e. a material which exhibits double-layer capacitance or pseudo-capacitance.

Preferably each of the electrodes comprises a capacitive material. Preferably each of the electrodes in a capacitive electrode pair contributes at least 30% of the capacitance between them.

The capacitance of conventional double-layer capacitive materials results from the ability to store electrical energy in an electrochemical double layer at the electrode-electrolyte interface. Pseudocapacitive materials are materials which can also store electrical energy, but through a different mechanism. An electrode or pair of electrodes can comprise both double-layer materials and pseudocapacitive materials.

A preferred double-layer capacitive material for the electrodes is carbon having a very large ratio of microscopic surface area to geometric surface area. Carbon paper impregnated with carbon aerogel is particularly preferred. Other carbon materials that can be used include carbon aerogel, e.g. monolithic carbon aerogel foam, woven carbon cloth, carbon fibers (e.g. pyrolized polyacrylonitrile fibers and pyrolized cellulose fibers), carbon nanotubes, carbon black, a polymer having carbon particles dispersed therein, carbon nanotubes, and frits of carbon particles.

It is also possible to use other conductive materials having a high microscopic surface area, for example sintered metals, nanoporous metals, for example nanaporous gold, perforated plates, porous frits, porous membranes, deLevi brushes, and metals that have been treated to increase their surface area, for example by surface roughening, surface etching or platinization.

Some pseudocapacitive materials are metal oxides which are relatively insoluble in water and many other solvents, and in which the metal can adopt different oxidation states, for example cobalt, manganese, iridium, vanadium and ruthenium oxides. In operation of electrodes comprising such materials, a redox reaction takes place in the solid phase of the electrode, with uptake or release of a specific ion, e.g. $H^+$ for ruthenium oxide. Other pseudocapacitive materials are solid materials into which a soluble ion, e.g. $Li^+$, can be inserted ("intercalation") or from which a soluble ion can be dispensed ("de-intercalation"), for example manganese nitrides, titanium molybdenum disulfides, carbon, and conducting polymers and such as polyaniline, polythiophene and polyacetylene. Some pseudocapacitive materials react with water, and should, therefore, be used with non-aqueous electrolytes. In operation of electrodes comprising such materials, a redox reaction takes place in the solid phase of the electrolyte, and results in release or uptake of ions. When the electrode is composed of a pseudocapacitive material, care is needed a) to correlate the electrolyte and the electrode, in order to provide the ions needed for the particular pseudocapacitive material and to prevent unwanted chemical reactions, and b) to preserve a balance between increasing ionic concentration (to support the reversible electrode reactions) and decreasing ionic concentration (to draw less current to increase the run time).

The electrode material is preferably insoluble in the electrolyte and has an electrical conductivity substantially greater than, preferably at least 100 times, the conductivity of the electrolyte. For example, the conductivity of a carbon aerogel foam is about 100 mho/cm and a conductivity of a typical electrolyte, 5 mM NaCl, is about $0.5 \times 10^{-3}$ mho/cm. The electrodes are preferably washed, and, if necessary, leached in the electrolyte before use. Porous electrodes are preferably degassed after such treatment.

Optionally, the electrolyte flows through the electrodes when the pump is operating. In order to accommodate flow of electrolyte through the electrodes, preferably at least 25%, and more preferably at least 50%, of the geometric area of the electrode is open and/or the flow permeability of the electrode material is at least 10 times, and particularly at least 100 times, the flow permeability of the porous dielectric medium in the conduit. Such electrodes can also be used when the electrolyte does not need to flow through the electrode. Often, so that the electrode has sufficient strength, the electrode has a thickness of at least 0.5 mm, preferably at least 1 mm, particularly at least 2 mm.

The rate at which the electrolyte flows through the conduit can be constant or variable. The power applied to the electrodes can be controlled with respect to voltage or current, or at some times one and at other times the other. The flow rate depends upon the potential drop over the conduit, which decreases as the capacitive electrodes are charged, particularly when the applied potential is comparable to the electrolysis potential. If desired, the power applied to the electrodes can be increased to compensate for this decrease, for example by using a constant current source, or by monitoring the potential drop across the conduit by means of sensors placed near the ends of the porous dielectric medium in the conduit (but preferably outside the direct field path between the electrode and the porous dielectric medium), and adjusting the power source appropriately. The power can alternatively or additionally be adjusted in response to temperature or another variable, for example to produce a desired heat transfer rate, temperature, flow rate, pressure, for example in response to a signal from a measurement device, e.g. through a feedback loop.

When the device is operated in the cyclic mode described below (in which the polarity of the power supply is changed from time to time), the cycle duration and the power supply can be controlled so that the total charge supplied in each cycle is the same, in order to ensure that the electrodes do not acquire a time-average positive or negative potential. When using a constant current power supply, the product of current and duration of each of the cycles is preferably the same. When using a constant voltage supply, the time-integrated current of each of the cycles is preferably the same.

Shape, Size and Positioning of Electrodes, and Current Flux on Electrodes

The capacitance of an electrode depends on its composition and on the size and shape of its active electrochemical surface. When the conduit is relatively short and wide, for example has an equivalent diameter which is 1 to 30 times, e.g. 5 to 20 times, its length, the area of the active electrochemical surface of the electrode is preferably 0.6 to 1.1 times, e.g. 0.8 to 1.0 times, the cross-sectional area of the conduit. The term "equivalent diameter" is used herein to mean the diameter of a circle having the same area as the cross-sectional area of the conduit. When the conduit is relatively long and narrow, for example has an equivalent diameter which is 0.01 to 0.3 times, e.g. 0.05 to 0.1 times, its length, the area of the active electrochemical surface of the electrode is preferably at least 2 times, particularly at least 10 times, especially at least 100 times, the cross-sectional area of the conduit.

During operation of the device, the rate at which charge is transferred to a particular area on the electrode is proportional to the current flux at that area, and as soon as any area of the electrode reaches the liquid electrolysis potential, chemical change of the electrolyte commences at that area. As a result, the run time of the device (i.e. the time for which the device will operate without chemical change of the electrolyte) depends on the highest current flux at any point on the electrode. Therefore, the smaller the maximum current flux on the electrode, the longer the run time. Furthermore, the smaller the variation in current flux over the electrode, the greater the total amount of charge that can be transferred to an electrode having a particular geometric size. In order to reduce the variation in current flux, the electrodes are preferably shaped and positioned so that the maximum current flux at any point on the electroactive surface of the electrode is at most 2 times, preferably at most 1.2 times, the minimum current flux at any point on the active surface. Those skilled in the art will have no difficulty in calculating the current flux at any point on the electroactive surface through the application of Laplace's equation.

In some devices, the conduit is a short tube which is filled by a transverse disc of porous dielectric material. In such devices, the electrodes are preferably substantially planar discs which lie on either side of the conduit and are parallel to each other and to the disc of porous dielectric material. The electrodes preferably cover at least 60%, particularly at least 80%, of the disc of porous dielectric material. The current flux on the electrodes in such devices can be relatively high, for example at least 0.05, e.g. 0.2 to 1, milliamps per $cm^2$.

In other devices, the conduit is a relatively long narrow tube, for example of round or rectangular (including square) cross-section, filled by porous dielectric material. The current flux on the electrodes in such devices can be relatively low, for example less than 0.05 milliamps per $cm^2$, less than 20 microamps per $cm^2$, or less than 2 microamps per $cm^2$, e.g. 1 to 20 microamps per $cm^2$. In such devices, the electrode can for example be:

a) an annular member placed concentrically around the end of a conduit of circular cross section or around the end of a via of circular cross section through which the current flows after leaving the conduit;

b) a pair of strips placed on either side of a via in the form of a slot through which current flows after leaving the conduit;

c) at least part of the interior concave surface of a spherical shell positioned so that its center is at the end of a conduit of circular cross section or at the end of a via of circular cross section through which the current flows after leaving the conduit; the inner diameter of the spherical shell can for example be 4 to 6 times, e.g. about 5 times, the diameter of the conduit; or d) at least part of the interior concave surface of a cylindrical shell positioned so that its axis is at the end of a conduit of generally rectangular cross-section or at the end of a via of generally rectangular cross-section through which the current flows after leaving the conduit, and so that its axis coincides with the long axis of that cross-section; the inner diameter of the cylindrical shell can for example be 4 to 6 times, e.g. about 5 times, the short axis of the rectangular cross-section; the ends of the cylindrical shell can be open or each end can be closed by at least part of the inner concave surface of a hemispherical shell which extends away from the conduit and is positioned so that its center is at one end of the rectangular cross-section of the conduit or via.

For further information about electrode shapes which will produce the desired substantially uniform field, reference can be made for example to Classical Electrodynamics (1975) by J. D. Jackson, and Complex Variables and Applications (1990) by R. V. Churchill and J. W. Brown the contents of which are hereby incorporated by reference.

Planar electrodes can be divided from sheet materials, for example sheet materials obtained by impregnating carbon aerogel into a carbon-fiber paper or by coating ruthenium oxide onto a metal sheet, screen or porous metal frit. Three-dimensional electrodes can be directly cast into the desired shape or machined out of a block, e.g. a carbon aerogel foam.

The leads to the electrodes are preferably placed and/or insulated so that they do not influence the electrical field in the electrolyte.

Voltage Drops

The greater the proportion of the applied voltage which is dropped across the conduit, the lower the applied voltage needed to obtain a given flow rate. Therefore, the device is preferably designed so that the voltage drop across the conduit is at least 10%, more preferably at least 50%, and more preferably at least 85%, of the voltage drop between the electrodes.

The device can include sensors for measuring the voltage drop across the conduit, and control means connected to the power supply to control the voltage supplied to the electrodes, in order to ensure that the electrolyte flows at a desired rate.

Conduits and Porous Dielectric Mediums

The conduit between the electrodes can be of any shape. In some embodiments, the conduit is relatively long and narrow. In other embodiments, it is relatively short and wide. The conduit preferably contains a porous dielectric medium. The porous dielectric medium can extend out from the conduit, be flush with the end of the conduit, or terminate within the conduit. However, it is also possible for the conduit to be an "open" conduit, i.e. a conduit which does not contain any packing material, or to be composed of a plurality of fine parallel channels. There can be two or more porous dielectric mediums within a conduit. In one embodiment, the conduit is divided into two sections, e.g. two relatively long and narrow sections, containing porous dielectric mediums having different zeta potentials (and preferably a zeta potentials of opposite sign), each of the two sections having one end adjacent to an electrode and an opposite end communicating with a central chamber which does not contain an electrode. Application of a suitable power source to the electrodes of such a device can cause the electrokinetic fluid in both sections to be pumped towards, or away from, the central chamber.

Suitable porous dielectric mediums are well-known to those skilled in the art, and can be organic, e.g. a porous polymer membrane or a phase-separated organic material, or inorganic, e.g. a porous sintered ceramic, a porous inorganic oxide (e.g. silica, alumina or titania) membrane or aerogel, packed silica beads, micromachined, stamped or embossed arrays, phase-separated porous glasses (e.g. Vycor), and phase-separated ceramics. Preferably the pores in the porous dielectric medium have a diameter of 50 to 500 nm, for example about 200 nm, so that the conduit has a high stall pressure (for which small pores are desirable) but does not have substantial double-layer overlap (which can result if the pores are too small). Other preferred features for the porous dielectric medium are a high zeta potential and a narrow pore size distribution. Particular examples of porous dielectric mediums are the high purity alumina membranes sold under the tradename Anopore, and porous polyvinylidene fluoride (PVDF) membranes, for example those sold under the tradename Durapore, which can have a pore size of 100-200 nanometers, and which can be modified to be hydrophilic and have a zeta potential of −30 to −60 millivolts.

The ionic strength of the electrolyte is preferably sufficient to provide a Debye length that is less than 0.1 times the diameter of the pores in the porous dielectric medium. The mobilities of the ions in the electrolyte are preferably less than 20 times, more preferably less than 3 times, and most preferably less than 1 time, the electroosmotic mobility of the porous dielectric medium.

The porous dielectric medium can have either a positive or a negative zeta potential. Electrolytes containing polyvalent ions having a charge of opposite sign to the zeta potential of the porous dielectric medium are preferably avoided. For example, phosphates, borates and citrates are preferably avoided when the porous dielectric medium has a positive zeta potential, and barium and calcium ions are preferably avoided when the porous dielectric medium has a negative zeta potential.

Spacers, Supports, Electrical Leads, and Assembly

The devices can contain one or more electrolyte-permeable internal spacers to separate components of the device. The electrical and flow resistances of such internal spacers are preferably much smaller than the electrical and flow resistances of the conduit. The spacers are generally composed of a large pore dielectric material, e.g. foamed polypropylene or acrylic polymer.

The devices can also contain one or more external supports to prevent the device from flexing during use and generally to maintain the components in a desired configuration. In operation, power must be supplied to the electrodes through leads, and these leads are often integral parts of the device. The leads preferably do not contact the electrolyte, and if they do, they are preferably composed of platinum or another electrochemically stable metal.

The components of the device can be secured together in any way. For example, they can be laminated together to form a chip-like assembly, e.g. as described in copending, commonly assigned U.S. application Ser. No. 10/198,223 filed Jul. 17, 2002, by Paul, Neyer and Rehm the entire contents of which are incorporated herein by reference.

Types of Electrokinetic Pumps

The pump can be a direct pump, in which the only liquid is the electrolyte. A direct pump propels the electrolyte along a flow path in which the electrolyte performs a useful function. A direct pump can be utilized when the heat exchange fluid functions as the electrolyte. Alternatively, the pump can be an indirect pump, in which pumping of the electrolyte causes flow of the heat exchange fluid in a part of the pump that is not subject to the electric field of the electrodes. In an indirect pump, the heat exchange fluid is a working fluid that does not function as the electrolyte.

In one form of indirect pump, the device includes a second conduit which is not subject to the electrical field of the electrodes and which has an open or openable end. In use, the second conduit is filled with electrolyte, the open end of the second conduit is placed in contact with the heat exchange fluid, and the device is operated so that the heat exchange fluid is drawn into the second conduit. The heat exchange fluid is expelled from the second conduit by reversing the flow direction of the electrolyte.

In another form of indirect pump, the pumping of the electrolyte changes the volume of a chamber containing the electrolyte, and thus changes the volume of an adjacent chamber so that heat exchange fluid is drawn into or expelled from the adjacent chamber. For example, the chambers can share an intermediate deformable member which changes shape as a result of flexure (e.g. a bellows) and/or stretching (e.g. a flexible diaphragm) and/or which comprises a piston/cylinder combination. The intermediate member can for example be composed of a multilayer polymeric film, which can be metallized. The chamber which contains the electrolyte, and whose volume changes, can be a chamber containing an electrode or a separate chamber, for example the central chamber in a device as described above in which two sections of the conduit communicate with a central chamber.

Two or more pumps can be connected in parallel for increased flow rates, or in series for increased pressures, e.g. as described in U.S. Pat. No. 6,719,535, the entire contents of which are hereby incorporated by reference herein.

As explained above, the electrokinetic pump can be operated in a cyclic mode. In the cyclic mode, the electrokinetic pump is first operated for a first period of time during which the electrolyte flows in one direction through the conduit; and thereafter the polarity of the power supply is reversed and the electrokinetic pump is operated for a second period of time during which the electrolyte flows in the opposite direction. Each period of time is sufficiently short that there is no substantial chemical change of the electrolyte.

Although the present invention has been described in considerable detail with reference to certain preferred versions thereof, other versions are possible. Therefore, the spirit and scope of the appended claims should not be limited to the description of the preferred versions described herein.

All features disclosed in the specification, including the claims, abstract and drawings, and all the steps in any method or process disclosed, can be combined in any combination except combinations where at least some of such features and/or steps are mutually exclusive. Each feature disclosed in the specification, including the claims, abstract, and drawings can be replaced by alternative features serving the same, equivalent or similar purpose, unless expressly stated otherwise. Thus, unless expressly stated otherwise, each feature disclosed is a one example only of a generic series of equivalent or similar features.

Any element in a claim that does not explicitly state "means" for performing a specified function or "step" for performing a specified function, should not be interpreted as a "means" or "step" clause as specified in 35 U.S.C. § 112.

What is claimed is:

1. A heat transfer system comprising:
  a) a first primary heat exchanger receiving heat from a first heat source;
  b) first and second secondary heat exchangers exhausting heat to first and second heat sinks;
  c) a second primary heat exchanger receiving heat from a second heat source;
  d) third and fourth secondary heat exchangers exhausting heat to third and fourth heat sinks;
  e) a conduit connecting the first and second secondary heat exchangers to opposite sides of the first primary heat exchanger, and the third and fourth secondary heat exchangers to opposite sides of the second primary heat exchanger, the first secondary heat exchanger and the third secondary heat exchanger being fluidly connected in series;
  f) an electrokinetic pump fluidly connected at one side thereof to the second secondary heat exchanger and at the other side thereof to the fourth secondary heat exchanger and pumping a heat exchange fluid between the primary heat exchangers and the secondary heat exchangers through the conduit; and
  g) a fluid flow controller coupled to the electrokinetic pump;
  wherein the electrokinetic pump is operated in a cyclic mode by the controller such that in one portion of a cycle the electrokinetic pump operates in a first direction and in a second portion of the cycle the electrokinetic pump operates in a second direction.

2. The heat transfer system of claim 1 wherein the conduit further connects the first and third secondary heat exchangers together.

3. The heat transfer system of claim 1 wherein at least two of the first, second, third and fourth heat sinks are the same heat sink.

4. The heat transfer system of claim 1 wherein the first heat source and the second heat source are the same heat source.

5. The heat transfer system of claim 1 wherein the conduit further connects the second and fourth secondary heat exchangers to the electrokinetic pump.

6. The heat transfer system of claim 2 wherein the conduit further connects the second and fourth secondary heat exchangers to the electrokinetic pump.

7. The heat transfer system of claim 1 wherein the heat exchange fluid comprises water.

8. The heat transfer system of claim 1 wherein the electrokinetic pump further comprises an electrolyte; and wherein the electrolyte and the heat exchange fluid are the same.

9. The heat transfer system of claim 1 wherein the electrokinetic pump further comprises an electrolyte; and wherein the heat exchange fluid is isolated from the electrolyte by a flexible member.

10. The heat transfer system of claim 1 wherein the heat exchange fluid is single-phase.

11. The heat transfer system of claim 1 wherein the heat exchange fluid is multiphase.

12. The heat transfer system of claim 1 further comprising:
  a plurality of additional primary heat exchangers and a plurality of additional secondary heat exchangers fluidly connected to the first secondary heat exchanger and the third secondary heat exchanger, two additional secondary heat exchangers being fluidly connected to each of the additional primary heat exchangers;
  wherein the plurality of additional primary heat exchangers and the plurality of additional secondary heat exchangers are connected in series along a single flow path by the conduit; and
  wherein the plurality of additional primary heat exchangers and the plurality of additional secondary heat exchangers are operated thermally in parallel.

* * * * *